United States Patent [19]

Vandevoorde

[11] Patent Number: 5,060,367

[45] Date of Patent: Oct. 29, 1991

[54] MACHINE FOR PLACING LABELLING SLEEVES ON BOTTLES OR THE LIKE

[75] Inventor: Jean-Claude Vandevoorde, Montdidier, France

[73] Assignee: Protection Decoration Conditionnement Europe Sa, Montdidier, France

[21] Appl. No.: 521,638

[22] Filed: May 10, 1990

[30] Foreign Application Priority Data

May 12, 1989 [FR] France ................................ 8906260

[51] Int. Cl.⁵ ...................... B29C 63/18; B65G 17/00; B65G 37/00

[52] U.S. Cl. ........................................ 29/775; 53/291; 53/399; 53/585; 156/423; 198/343.2

[58] Field of Search .......................... 156/86, 294, 423; 53/291, 292, 297, 399, 585; 29/775, 429, 822; 198/343.1, 343.2; 211/218

[56] References Cited

U.S. PATENT DOCUMENTS

| | | | |
|---|---|---|---|
| 4,215,460 | 8/1980 | Amberg et al. | 29/775 |
| 4,238,267 | 12/1980 | Konstantin | 156/86 |
| 4,293,364 | 10/1981 | Fujio | 156/86 |
| 4,354,333 | 10/1982 | McArdle | 53/291 |
| 4,387,553 | 7/1983 | Strub et al. | 53/585 |
| 4,519,186 | 5/1985 | Winter et al. | 156/86 |
| 4,562,684 | 1/1986 | Dreher | 29/775 |
| 4,653,972 | 3/1987 | Lewis | 198/343.2 |

FOREIGN PATENT DOCUMENTS 2142900 1/1985 United Kingdom .

*Primary Examiner*—Michael W. Ball
*Assistant Examiner*—Steven D. Maki
*Attorney, Agent, or Firm*—Panitch Schwarze Jacobs & Nadel

[57] ABSTRACT

A machine is provided for placing labelling sleeves on bottles or the like which includes a device (1) for presenting labelling sleeves in a discontinuous manner, a device (4) for the continuous running-through of the bottles to be labelled, a transfer assembly (2) for the sleeves comprising a plurality of independent carriages which are movable on an endless guiding path (10), a flexible and endless drive belt (18) developing, on guide means ($17_1$, $17_7$), in the vicinity of the guiding path (10), means (19, 20) connecting the flexible belt and the carriages, this flexible belt (18) having locally at least one area which develops in a perpendicular manner with respect to the belt, in the form of a loop.

6 Claims, 3 Drawing Sheets

MACHINE FOR PLACING LABELLING SLEEVES ON BOTTLES OR THE LIKE

The invention relates to a machine for placing labelling sleeves on bottles or the like.

This machine is characterised in that it comprises a device for presenting the labelling sleeves in a discontinous manner, a device for the continuous run-through of the bottles to be labelled, an assembly for transferring the sleeves from the device presenting the sleeves and towards the bottles on the bottle run-through device, this transfer assembly comprising a plurality of independent carriages for supporting the sleeves, these carriages being moveable on an endless guide path, a flexible and endless drive belt developing, on guide means in the vicinity of the guide path, means connecting the flexible belt and the carriages, this flexible belt having locally at least one area which develops in a manner perpendicular to the belt, in the form of a loop, in order to stop the carriages momentarily and successively in front of the device presenting the sleeves in a discontinuous manner.

According to a further feature of the invention, the carriages each comprise two sleeve receiving supports, these supports being moveable towards one another on slides and each co-operating with an enclosed cam path in order to move the supports towards and away from one another.

In accordance with a further feature of the invention, the means connecting the flexible belt and each carriage are formed by a carrier which can move in a slide, this carrier and slide being secured, one to the carriage and the other to the belt.

According to a further feature of the invention, the machine comprises an assembly for placing the sleeves on the bottles continuously running through, this placing assembly receiving the sleeves from the transfer assembly and comprising a plurality of devices for clamping the sleeves, these devices being associated with means moving these clamping devices in translation along an enclosed line.

The invention is illustrated by way of non-limiting example in the attached drawings wherein.

Figure 1:
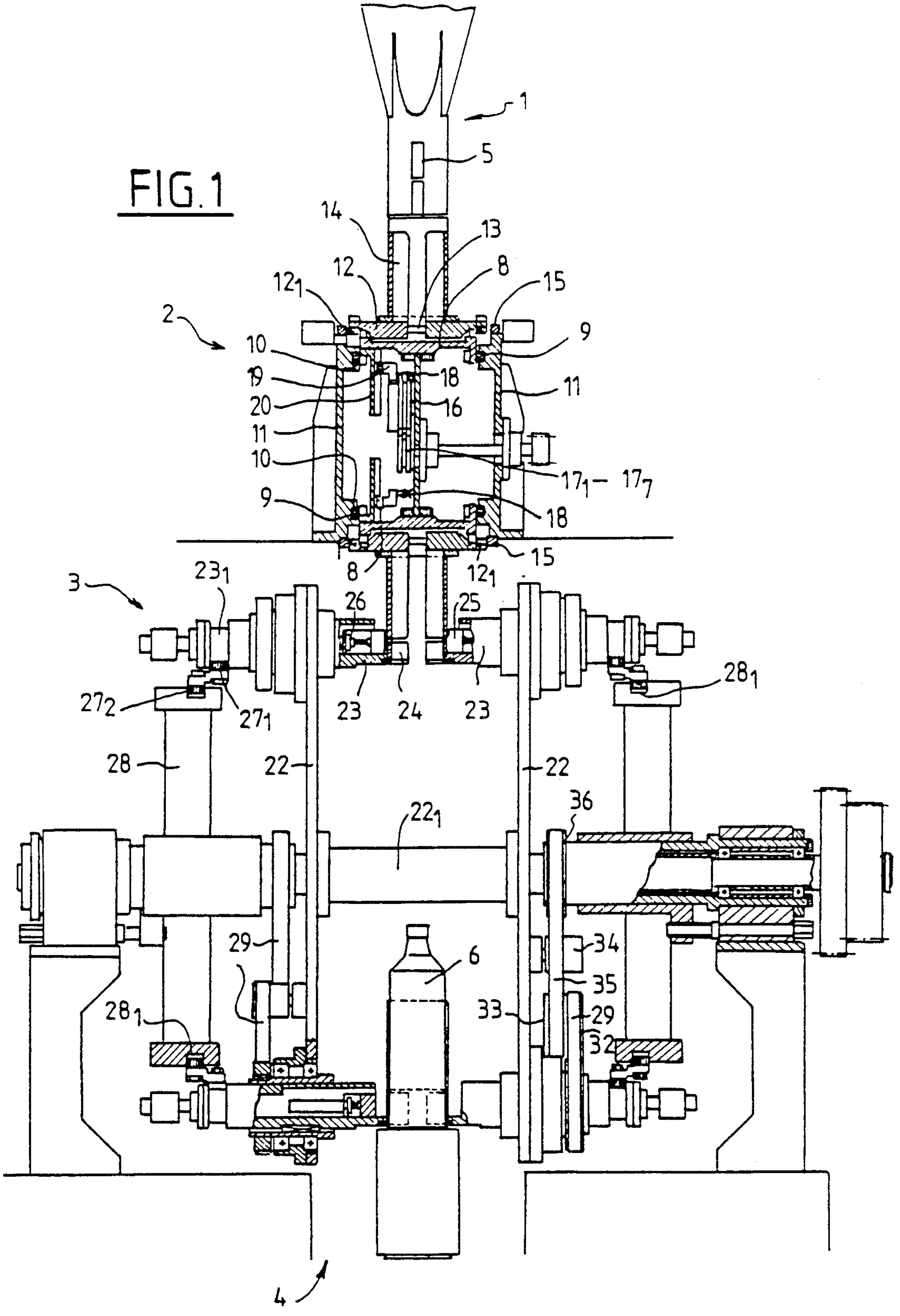
FIG. 1 is an end view partially in section of a machine according to the invention.

The aim of the present invention is therefore to produce a machine which places labelling sleeves on bottles or the like and in particular on full bottles moving continuously on a conveyor.

These bottles must in effect be labelled as they move since it is inconceivable to obtain high labelling rates if the bottles must be immobilised in succession in order to label them and then start them moving again.

This type of abrupt stopping and starting is in fact not conceivable for full bottles in view of their weight.

The machine shown in the attached drawings consists of four parts, i.e. a part (1) which successively presents the sleeves in a discontinuous manner, a transfer device (2) receiving successively and in a discontinuous manner the sleeves from the device (1) and transferring them continuously to a device (3) which places the sleeves continuously on the bottles which run through continuously on a conveyor path (4).

This machine thus enables these sleeves to be placed continuously on bottles passing along on a conveyor from a successive and thus discontinuous sleeve supply.

The device for presenting the sleeves comprises a forming device (5) in the form of a cylinder, of which the cross-section corresponds to that of the bottles (60) to be labelled.

Over the periphery of this cylinder (5) there is disposed a plurality of sets of rollers against which pairs of drive rollers (6 and 7) come to bear.

The labelling sleeves threaded onto the forming device (5) are connected to one another by a circular line of perforations and these sleeves are brought between the rollers ($5_1$), on the one hand, and the pairs of rollers (6 and 7), on the other hand, until a perforation line is located between the rollers (6 and 7). At this moment, the rollers (6) are immobilised whilst rollers (7) continue to be driven. In this way the sleeves are separated at the level of their perforation lines. These sleeves are then successively taken over by the transfer device (2) which comprises a plurality of independent carriages (8) moved by means of their track rollers (9) in the endless guide paths (10) formed on two parallel end plates (11).

Each carriage (8) receives two bases (12) which are mounted so as to slide with respect to one another on slides (13) transverse to the direction of movement of the carriage (8). Each base (12) supports a blade (14), of which the shape and dimensions correspond substantially to those of half a bottle (60). Each base (12) is likewise provided with a roller ($12_1$) co-operating with an enclosed cam path (15) provided on each of the end plates (11) comprising the endless guide paths (10) for the carriages (8).

In the median plane of the end plates (11) a partition (16) is provided which acts as a support for an assembly of pinions ($17_1$ to $17_7$), on which an endless chain (18) is tensioned.

This chain (18) is provided with regularly spaced carriers (19) which each locate, by means of a track roller, in a U-shaped profiled section (20) mounted in a perpendicular manner under each of the carriages (8).

This transfer device operates as follows:

The chain (18) is driven so as to move at a uniform speed by a drive unit not illustrated and it drives the carriages (8) at this same uniform speed by means of the carrier (19) and the profiled section (20) in so far as the distance between the chain (18) and the guide paths (10) remains constant. In contrast, between the rollers ($17_6$ and $17_7$), the chain (18) moves away from the guide paths (10) such that when a carriage is driven by the chain (18) between these two pinions ($17_6$ and $17_7$) its speed of movement slows down whilst the roller provided at the end of the carrier (19) moves into the profiled section (20). On the other hand, the speed of movement of the carriages increases between the rollers ($17_7$ and $17_1$).

Figure 2:
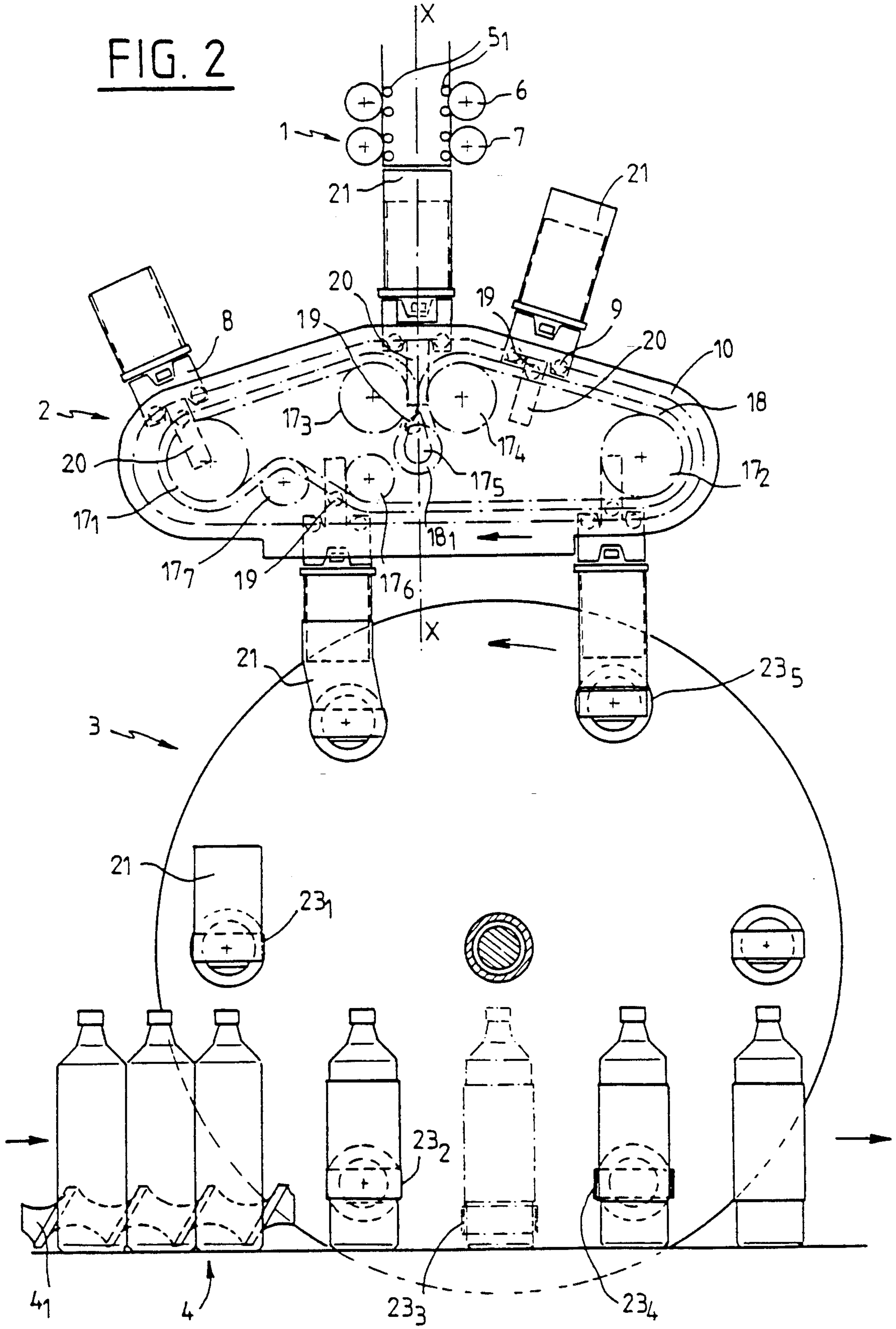
FIG. 2 is a view from the left partially in section of FIG. 1.

As can be seen in FIG. 2, the pinions ($17_3$ and $17_4$) in conjunction with roller ($17_5$), give the chain (18) the shape of a loop ($18_1$) at the level of which the chain develops locally in a direction X—X which is perpendicular to the endless cam path (10).

Thus, when a carriage (8) is brought by the chain (18) vertically below the presenting device (1) the carrier (19) driving this carriage moves in the corresponding slide (20) whilst holding the carriage immobile. The roller of this carrier subsequently leaves the profiled section (20) during the period where it passes through the loop ($18_1$) around the pinion ($17_5$) and is then inserted again in this profiled section (20) in order to cause the carriage (8) to start moving again.

All the time the carriage is stopped, the rollers (7) have separated and drive one of the sleeves so as to place it on the blades (14) of this carriage. At this stage, the blades (13 and 14) are moved towards one another by the rollers ($12_1$) co-operating with the enclosed cam paths (15).

When this carriage provided with a sleeve is again driven by the chain (18) so as to move, the cam paths (15) cause the blades (13 and 14) to move apart so as to tension the sleeve (21) then, when this carriage arrives above the sleeve placing device (3), the blades (14) again move towards one another so as to enable these sleeves to be continuously conveyed towards the placing device (3).

Figure 3:
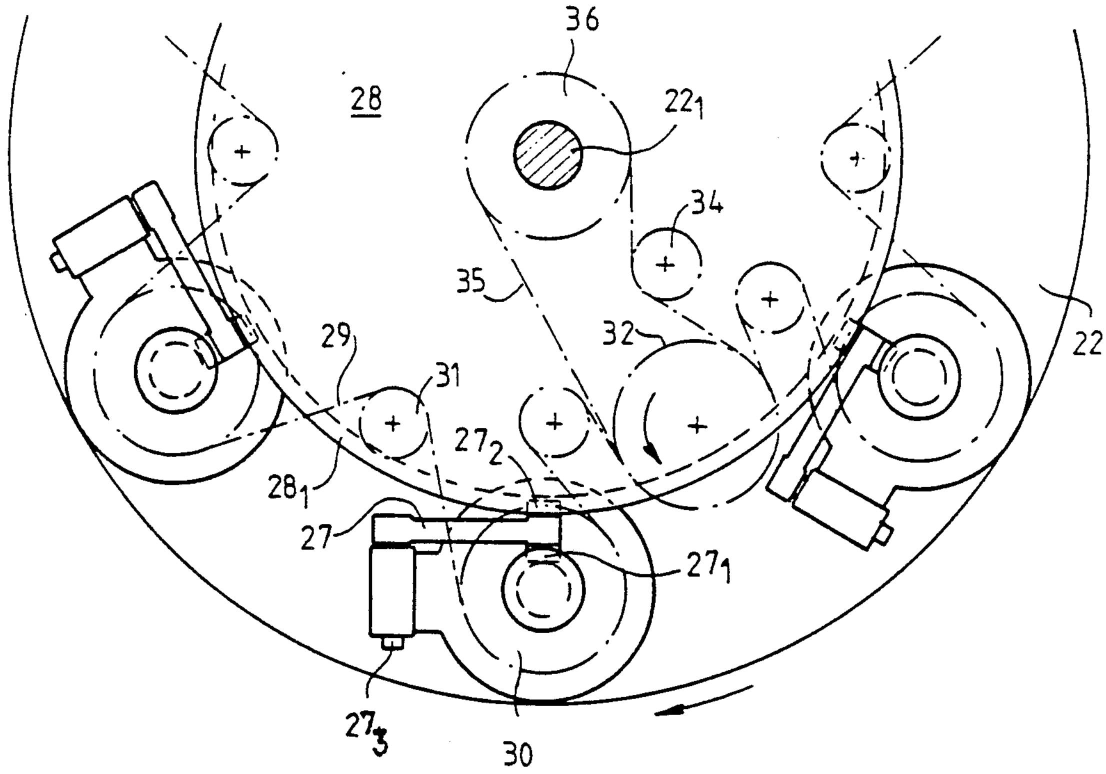
FIG. 3 is a partial view of the machine drum shown in FIGS. 1 and 2.

This placing device (3) consists of a drum substantially comprising two circular parallel end plates (22) bearing on their periphery axially moveable sleeve clamping devices (23) which are disposed opposite one another. Each clamping device comprises a fixed section (24) located opposite a moving section (25) driven so as to move by a drive unit (26) consisting, for example, of a solenoid plunger electromagnet. Each clamping device is provided (see FIG. 3) with an arm (27) which pivots on a shaft ($27_3$) and comprises at its free end cams ($27_1$ and $27_2$), of which one, ($27_1$), comes to rest in a circular groove ($23_1$) in the corresponding clamp (23), and the other, ($27_2$), comes to rest in the circular cam groove ($28_1$) formed on the periphery of a fixed ring (28). This arrangement thus enables the clamping devices (23) to be moved towards or away from one another in order to tension or, on the contrary, to release the sleeve clamped between the sections (24 and 25) of the clamps.

Similarly, this sleeve-placing device (3) comprises means moving the clamping devices (23) in translation while the drum (22) rotates. The clamps (24, 25) and the sleeve they support are thus moved parallel to themselves over a circular path, i.e. parallel to the axis of the bottles (60) which are to receive these sleeves.

These means consist (see FIG. 3) of an endless belt (29) which passes over pulleys (30) provided on each of the clamping devices (23) and on return pulleys (31). This belt (29) also passes over a pulley (32) on the shaft of which a second pulley (33) is mounted (see FIG. 3).

A belt (35), which also passes over a pulley (36) which is rotatably mounted on the shaft ($22_1$) supporting the drum end plates (22), is tensioned on this second pulley (33) by means of a pulley (34).

The drive ratios of these pulley and belt assemblies are determined such that, for a given angular displacement of the drum end plates (22), an identical angular displacement of all the clamping devices (23) of the two end plates (22) is obtained, such that they are driven according to a circular translation movement, parallel to the axis of the bottles (60).

Thus, by driving the drum end plates (22) at a peripheral speed corresponding to the run-through speed of the bottles (60) on the conveyor (4), and by synchronising the arrival of the bottles, by a screw ($4_1$), with the lowering of the clamping devices (23), the sleeves (21) supported by the clamping devices (23) are placed automatically and continuously on the bottles which are presented, without the movement of these bottles being retarded.

Of course, during this operation when the sleeves are placed on the bottles, the clamping devices (23) are manouevered from the cam paths (27) so as to move them closer together or further apart.

Thus at ($23_1$ and $23_2$), the clamping devices (23) are moved away from one another so as to enable them to pass over a bottle and place a sleeve. At ($23_3$) the drive unit (26) is activated so as to move the sections (24 and 25) of the clamps apart, whilst the downward movement of the clamping members (23) continues owing to the fact that the end plates (22) are rotating. The fixed sections (24) of the clamps subsequently slide over the lower part of the sleeves (21) which are themselves held on the bottles by simple friction. At $23_4$ the clamping devices are moved away from one another whilst they move up the bottle again so that they finally separate therefrom. At ($23_5$) the clamping devices are again moved towards one another whilst the moveable sections (25) are moved away from the fixed sections (24) so as to receive continuously the sleeves which are presented and are each supported on a carriage (8).

In the example shown and for reasons of convenience with respect to dimensions, the machine comprises a device (3) for placing sleeves between the device (2) for transferring the sleeves and the device (4) for transferring the bottles.

However, according to a further embodiment, the device (3) may be omitted and in this case the device (2) transfers the sleeve directly to the bottles (60). The chain (18) is driven at a uniform speed corresponding to the run-through speed of the bottles. Likewise, the lower face of the device (2) has a shape and structure adapted such that the carriages can be moved in translation while the sleeves are being placed on the bottles.

I claim:

1. Machine for placing labelling sleeves on bottles comprising a device (1) for presenting the labelling sleeves in a discontinuous manner, a device (4) for the continuous run-through of the bottles to be labelled, an assembly (2) for transferring the sleeves from the sleeve presenting device (1) and towards the bottles on the bottle run-through device (4), the transfer assembly comprising a plurality of independent sleeve-supporting carriages (8), these carriages being moveable on an endless guide path (10), an endless flexible drive belt (18) developing, on guide means ($17_1$, $17_7$), in the vicinity of the guide path (10), means (19, 20) connecting the flexible belt and the carriages, the flexible belt (18) having locally at least one area ($18_1$) developing perpendicular to the belt, in the form of a loop, in order to stop the carriages (8) momentarily and in succession in front of the device (1) presenting the sleeves in a discontinuous manner.

2. Machine as claimed in claim 1, wherein the carriages (8) each comprise two supports (14) for receiving the sleeves and rollers ($12_1$), the supports being moveable towards one another on slides (13) and the rollers ($12_1$) co-operating with an enclosed cam path (15) to move the supports towards and away from one another.

3. Machine as claimed in claim 1, wherein the means connecting the flexible belt (18) and each carriage (8) comprises a carrier (19) which is moveable in a slide (20), the carrier and the slide being secured to the belt (18) and the carriage (8) respectively.

4. Machine as claimed in claim 1, further comprising an assembly (3) for placing sleeves on the bottles running through in a continuous manner, the placing assembly receiving the sleeves from the transfer assembly (2) and comprising a plurality of devices (23) for clamping the sleeves, these devices being associated with means (29, 30, 32, 35, 36) moving these clamping devices in translation along an enclosed line.

5. Machine as claimed in claim 4, wherein the device moving the clamping devices (23) in translation comprises a drum which is rotatably mounted and comprises two end plates (22), the two end plates comprising on their periphery the clamping devices (23) for the sleeves, the clamping devices (23) being provided with pulleys over which there passes a belt (29) which is connected to a fixed pulley (26) co-axial to an axis of the drum.

6. Machine as claimed in claim 4, wherein each end plate (22) of the drum is associated with a fixed ring (28) provided on its periphery with a circular cam path ($28_1$), carriers ($27_1$, $27_2$) connected to the clamping devices coming to rest in the cam paths so as to move the clamping devices towards or away from one another.

* * * * *